Figure 1:
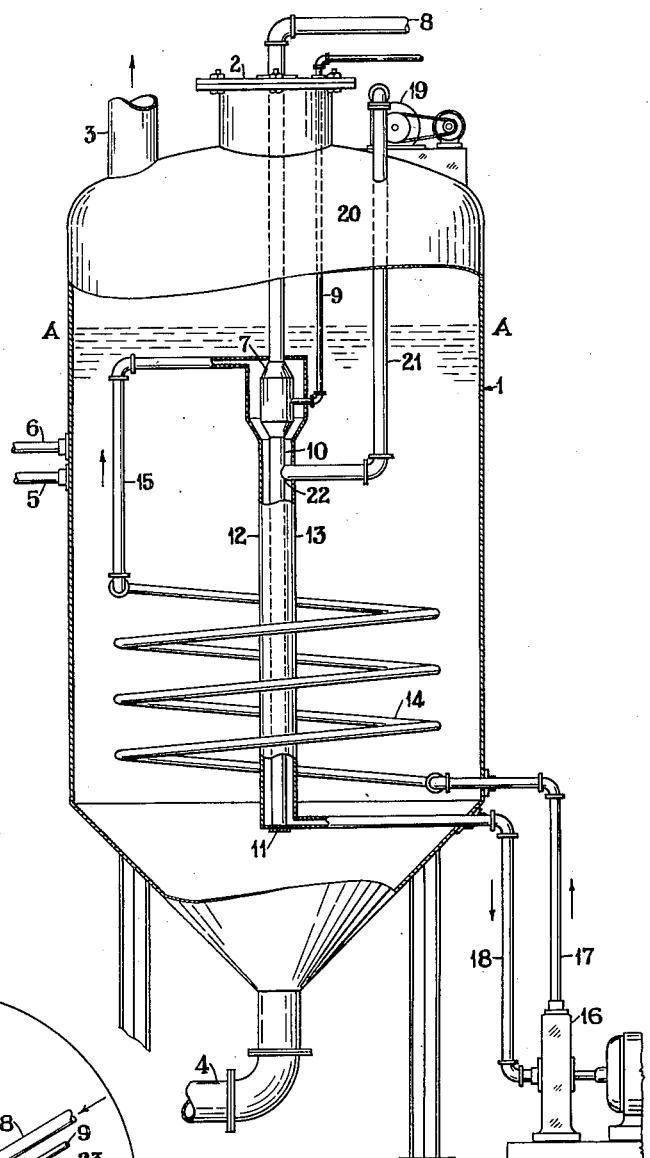

Feb. 22, 1955     L. W. PETERSEN     2,702,594
APPARATUS FOR CONCENTRATION OF CHARRABLE
HEAT-SENSITIVE LIQUIDS
Filed Aug. 22, 1949

Lowell W. Petersen
INVENTOR.

BY R. J. Story

ATTORNEY

United States Patent Office 2,702,594
Patented Feb. 22, 1955

2,702,594

APPARATUS FOR CONCENTRATION OF CHARRABLE HEAT-SENSITIVE LIQUIDS

Lowell W. Petersen, Chicago, Ill., assignor to Swift & Company, Chicago, Ill., a corporation of Illinois Application August 22, 1949, Serial No. 111,744

5 Claims. (Cl. 159—16)

This invention relates to a method and apparatus for the concentration of charrable, heat-sensitive liquids, and more particularly it relates to a method of concentrating charrable organic liquids by direct contact therewith of combustion gases which have been cooled to a point where charring of the liquid is avoided and to apparatus for carrying out the said method.

The concentration of such liquids in the past has generally been carried out through the use of jacketed vessels of various types wherein the heating medium was separated from the liquid to be concentrated by metal walls or the like. The principal reason for this has been the difficulty encountered in the prevention of charring or burning of the liquids when direct contact of the heating gases with the liquid was provided. It is well known that direct gas contact with the liquid to be concentrated is a more efficient means of heat transfer and, in addition, the bubbling of the gases through the liquid provides agitation thereof with a further gain in efficiency of heating. This direct contact combustion gas type of concentration is widely used in the evaporation and concentration of inorganic liquids. However, the problem with respect to the concentration of heat-sensitive organic liquids is much more difficult. Organic liquids, such as milk, whey, and the like, are extremely heat sensitive, and direct contact of hot combustion gases with such liquids has in the past resulted in considerable charring and burning of the material being concentrated. For example, when whey is being concentrated for use in animal foods, the resulting product of a direct contact combustion gas evaporation is of a blackish-brown color due to charring rather than of the desirable light brown, tan, or cream color of concentrated whey made by the less efficient evaporating and concentrating methods. In contrast to these difficulties of charring and the like, the increased efficiency and lower cost of a direct contact combustion gas concentration plant make it very desirable from the standpoint of economy that some means be devised to permit the use of direct contact combustion gas concentration in the concentration of charrable, heat-sensitive liquids.

An object of this invention is to provide apparatus for carrying out the introduction of partially cooled combustion gases into a charrable liquid being concentrated whereby the said liquid is not affected by charring.

Additional objects, if not specifically hereinafter pointed out, will be apparent to one skilled in the art from the following detailed description of the invention:

Generally, the invention resides in the provision of apparatus for cooling down incoming hot combustion gases, prior to contact thereof with the liquid to be concentrated, to a sufficiently low temperature to prevent charring of the organic liquid being concentrated upon contact therewith of the said gases. This cooling of the incoming hot gases is preferably effected by the use of two methods in combination, although in some instances either alone may be sufficient:

1. Introducing a portion of the vapors from the vapor space above the liquid being concentrated into the hot gas stream below the combustion chamber and at a point prior to the contact of the said hot gas stream with the liquid being concentrated.

2. Providing a heat-transfer system surrounding the combustion chamber and hot gas extension tube, said system containing a suitable heat-transmitting fluid, whereby direct contact of the liquid being concentrated with the hot walls of the combustion chamber and/or hot gas extension tube is avoided.

Figure 2:
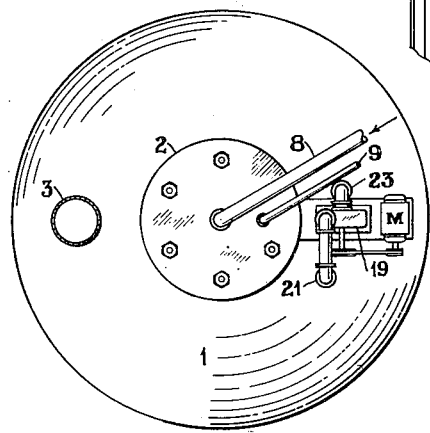

Figure 1 represents a sectional elevation of the preferred form of the apparatus of this invention. Figure 2 is a top view of the same apparatus.

Referring to Figure 1, 1 represents a conventional evaporator shell having a clean-out port 2, vapor-take-off line 3, and a concentrate removal line 4. The liquid within the evaporator shell 1 is supplied through line 5 and, for the purpose of illustration, the liquid level within the shell is shown by the line A—A. Line 6 furnishes a means of admitting foam depressants to the evaporator should the use of such depressants be desirable. Numeral 7 indicates a combustion chamber which is supplied with gaseous fuel under pressure through line 8. 9 is the ignition line for setting the burner in operation. 10 is the hot gas extension tube or hot gas heat-transfer surface which conducts the combustion gases from the combustion chamber 7 to ports 11 through which the said gases enter directly into the liquid being concentrated. 12 represents a preferred form of the self-contained heat-transfer system used to help cool down the hot combustion gases to the point where the liquid being concentrated is not charred. A jacket 13 completely encloses the combustion chamber and the hot gas extension tube heat-transfer surfaces except for the exit ports 11 previously referred to. A heat-exchange coil 14 is located within the liquid-containing portion of the evaporator body and connected at one end with the jacket 13 by means of pipe 15 and connected at the other end with a circulating pump 16 by means of line 17. The said circulating pump is connected at its intake side by line 18 with the lower end of jacket 13, thus completing the self-contained system. Vapor compressor 19 mounted atop the evaporator shell draws vapor from the vapor space 20 in the evaporator and discharges such vapor through line 21 into the hot gas extension tube 10 at point 22. Suitable valves and the like are, of course, provided on the various lines, but since they are not part of this invention, they have been omitted for the sake of clarity of the drawing. Numeral 23 in Figure 2 represents the intake line of vapor compressor 19, said intake line being connected at its lower end with vapor space 20, of the evaporator body.

In operation, the liquid to be concentrated is admitted to the evaporator shell 1 through inlet line 5 to the desired level which will depend upon the particular liquid being evaporated and other variable conditions. Gaseous fuel is then supplied through line 8 to the combustion chamber under pressure usually from a combustible gas compressor (not shown in the drawing) along with the correct amount of air supplied through a conventional proportioning device which does not form part of this invention. The fuel is ignited in the combustion chamber by closing an ignition switch connecting the ignition line 9 with a transformer or other suitable source of electrical energy. The closing of the ignition switch may also function to start the motor running circulating pump 16 although this pump may be supplied with a separate starting circuit if so desired. In a similar manner the vapor compressor 19 may be started by the closing of the combustion chamber ignition switch or by a separate control system if desired. The hot combustion gases leave the combustion chamber 7 and pass down through the hot gas extension tube or heat-transfer surfaces 10, giving up some of their heat by conduction and radiation through the metal walls of the tube to the heat-transmitting fluid contained within the heat-exchange sysem 12. The heat-transmitting fluid continuously circulates throughout the aforesaid system, in the direction shown by the arrows on the drawing or in the reverse direction if so desired, which system in turn passes the heat obtained from the combustion gases on to the liquid being concentrated. The heat-transmitting or conducting fluid contained within this heat-exchange system may be any suitable gaseous or liquid, organic, inorganic, or metallic heat-transmitting fluid. At point 22 in the hot gas extension tube, the hot combustion gases are admixed with the relatively cool vapor from the vapor space 20 through line 21 and compressor 19, the said vapor serving to cool the gases down to an appreciable extent so that when the combined combustion gas-vapor mixture exits from the hot gas extension tube 10 through ports 11 into the body of the charrable organic liquid being concentrated, it is at a sufficiently low temperature to avoid charring of the said liquid. When the liquid is concentrated to the desired degree, it may be drawn off through line 4 at the base of the evaporator for further processing. It is obvious that the combustion gases may be supplied from an outside burner to the evaporator. However, having the burner located within the evaporator shell, as illustrated in Figure 1, is preferable since greater control of the temperature of the hot gases is thereby available. Although the burner or combustion chamber of the preferred form of the apparatus is shown as completely submerged in the liquid being concentrated, it may, if desired, be positioned above the liquid level in the evaporator. In a similar manner, the heat-transfer system 12 as illustrated is the preferred form thereof, but obviously many modifications may be used if so desired. For example, the heat-exchange coil 14 may be omitted and the fluid circulated through the jacket 13 alone, or the jacket may be evacuated and still serve to reduce the temperature of the hot metal surfaces.

The temperature of the hot combustion gases leaving the combustion chamber will vary to a considerable extent depending on the fuel used. A typical gaseous fuel, such as a natural gas composed of approximately 82.8% $CH_4$, 16.3% $C_2H_6$, 0.8% illuminants, when mixed with 9 to 10 volumes of air, will produce a temperature of about 1800–2800° F. in the combustion chamber, depending upon the gas-air ratio used. By the use of the heat-transfer system 12 alone, this temperature may be reduced to approximately 190° F. at the exit ports 11. By the use of the vapor-return system 21 alone, the temperature may be reduced to about 300° F. at the exit ports 11 if sufficient vapor is added. It is contemplated that in no event would an excess of about 50% of the vapors be required to be recycled. When used in combination, the temperature of the combustion gases contacting the organic liquid at ports 11 is reduced to around 190° F., which is sufficiently low to prevent charring of an organic liquid, such as whey. The degree of reduction of temperature may be controlled to some extent by varying the amount of vapor per unit time fed into the hot gas stream or by varying the amount of heat-transfer surface within system 12. The rate of circulation of the heat-transfer liquid must be high enough to create turbulent flow conditions within the closed system 12. Using other fuels and concentrating less heat-sensitive organic liquids than milk or whey, it may be possible to eliminate either the vapor-return system or the heat-transfer system and still obtain sufficient reduction in temperature of the hot combustion gases to avoid charring of the liquid.

As can be seen from the foregoing description, the method of this invention successfully overcomes the disadvantages of the use of direct contact combustion gas concentration of charrable heat-sensitive or organic liquids thereby opening up a new and more efficient field of concentrating such liquids to the industry. This invention is of particular value to dairy, sugar, and other industries engaged in concentrating solutions of organic materials. It is obvious that the invention could be used in the concentration of solutions of inorganic substances, but it would in general find small usage in such fields since the problem, as pointed out above, of charring is usually not present in the concentration of most inorganic solutions.

The apparatus as disclosed above is capable of installation in the conventional evaporator shell and hence a change over to direct contact combustion gas concentration would not necessitate a great outlay for new equipment. Further, the apparatus of this invention takes up considerably less space than the conventional double and triple effect evaporators in common use today and, consequently, will permit greater production from the same plant area than is now possible.

The word "charring" as used in the claims describes the condition at which the concentrating organic product begins to approach blackish color. By the term "charrable" is meant that property of the product which renders it subject to charring.

Obviously, many modifications and variations of the invention as hereinbefore set forth may be made without departing from the spirit and scope thereof, and therefore only such limitations should be imposed as are indicated in the appended claims.

I claim:

1. Apparatus for concentrating heat-sensitive liquids comprising in combination an evaporator shell having a liquid-containing body portion and a vapor head space therein; a combustion chamber mounted within said liquid-containing body portion and beneath the surface of the liquid therein; a relatively long tube extending from the said combustion chamber and opening at the lower end thereof into the lower portion of the body of the said evaporator, said tube being disposed within and below the surface of said liquid; means connecting the said tube with the vapor space of the evaporator for transferring vapor to said tube; and a closed self-contained heat-exchange system substantially surrounding the aforesaid tube and combustion chamber.

2. Apparatus for concentrating heat-sensitive liquids comprising in combination an evaporator shell having a liquid-containing body portion and a vapor head space; a combustion chamber mounted therein beneath the surface of the liquid in said body portion; a relatively long, small diameter tube extending from the said combustion chamber and opening at the lower end thereof into the lower portion of the liquid-containing portion of the said evaporator body, said tube being disposed within and beneath the surface of said liquid; means connecting the said tube with the vapor-containing portion of the said evaporator body for transferring vapor to said tube; and a closed heat-exchange system comprising a jacket substantially enclosing the aforesaid tube and combustion chamber, heat-exchange coils located within the liquid-containing portion of the evaporator and connected to the said jacket, and means to provide constant circulation of a heat-transmitting fluid contained within the said heat-exchange system.

3. Apparatus for concentrating heat-sensitive liquids comprising in combination an evaporator shell having a liquid containing body portion and a vapor head space; a combustion chamber mounted therein beneath the surface of the liquid in said body portion; a relatively long, small diameter tube extending from said combustion chamber and opening at the lower end thereof into the lower portion of the liquid-containing portion of the evaporator body, said tube being disposed within and beneath the surface of said liquid; a jacket substantially enclosing said tube and combustion chamber; heat exchange coils located within the liquid-containing portion of the evaporator body and connected to each end of said jacket; and means to provide constant circulation of a heat-transmitting fluid contained within said jacket and coils.

4. Apparatus for concentrating heat-sensitive liquids comprising in combination an evaporator shell having a liquid-containing body portion and a vapor head space therein; a combustion chamber mounted within said liquid-containing body portion and below the surface of the liquid therein; a relatively long, small diameter, hot gas tube connected at one end to said combustion chamber and opening at the other end thereof into the lower part of the liquid-containing portion of the evaporator, said tube being disposed within and beneath the surface of said liquid; means connecting said tube at a point intermediate said combustion chamber and said open end with said vapor head space for transferring vapor to said tube; a jacket substantially enclosing said tube and combustion chamber; heat exchange coils positioned annularly about the exterior of said jacket within the liquid-containing portion of the evaporator and connected to each end of said jacket; and means to provide constant circulation of a heat-transmitting fluid completely contained wtihin said jacket and coils.

5. In an apparatus for concentrating heat-sensitive liquids having a combustion chamber including a relatively long, hot gas tube extending therefrom disposed beneath the level of the liquid to be evaporated in an evaporator body, the combination with said tube of a vapor return tube connected at one end to the vapor head space of the evaporator and at the other end with said hot gas tube at a point downstream of the point of communication of said hot gas tube with said combustion chamber, and means associated with said vapor return tube for transferring vapor to said hot gas tube.

References Cited in the file of this patent

UNITED STATES PATENTS

| | | | |
|---|---|---|---|
| 291,520 | Kayser | Jan. 8, | 1884 |
| 418,642 | Gillet | Dec. 31, | 1889 |
| 953,682 | Benjamin | Apr. 5, | 1910 |
| 1,537,563 | Suczek | May 12, | 1925 |
| 2,005,422 | Hunicke et al. | June 18, | 1935 |
| 2,042,488 | Theiler | June 2, | 1936 |
| 2,086,902 | Doennecke et al. | July 13, | 1937 |
| 2,330,440 | Maude | Sept. 28, | 1943 |
| 2,334,563 | Lavine et al. | Nov. 16, | 1943 |
| 2,373,359 | Voogd et al. | Apr. 10, | 1945 |
| 2,506,853 | Berg | May 9, | 1950 |
| 2,538,412 | Cecil et al. | Jan. 16, | 1951 |
| 2,594,063 | Norman | Apr. 22, | 1952 |